United States Patent [19]
Contee, Jr.

[11] Patent Number: 5,472,164
[45] Date of Patent: Dec. 5, 1995

[54] MULTI PURPOSE GRILL HANGER BRACKET

[75] Inventor: Howard S. Contee, Jr., 2219 Drexel Ct., Dalzell, S.C. 29040

[73] Assignee: Howard S. Contee, Jr., Dalzell, S.C.

[21] Appl. No.: 164,343

[22] Filed: Dec. 9, 1993

[51] Int. Cl.⁶ ..................................... A47B 96/06
[52] U.S. Cl. .......................... 248/214; 126/25 R
[58] Field of Search ................... 248/214, 215, 248/311.2, 208; 126/25 R, 30

[56] References Cited

U.S. PATENT DOCUMENTS

| | | |
|---|---|---|
| 3,032,783 | 3/1962 | Swanson, Jr. . |
| 3,433,443 | 3/1969 | Mangan . |
| 4,059,248 | 11/1977 | Kuntz . |
| 4,709,891 | 12/1987 | Barnett ................................... 248/214 |
| 4,729,535 | 7/1988 | Fraizer . |
| 4,840,118 | 6/1989 | Rinehart ............................. 126/5 R X |
| 4,850,282 | 6/1989 | Postic . |
| 4,872,816 | 10/1989 | Fetcko ................................ 248/215 X |
| 4,893,363 | 1/1990 | Huff . |
| 5,009,380 | 4/1991 | Fee . |
| 5,033,448 | 7/1991 | Sandweg ............................... 126/25 R |
| 5,118,059 | 6/1992 | Mainer ................................... 248/215 |
| 5,127,188 | 7/1992 | Shaw ................................ 248/215 X |
| 5,165,384 | 5/1992 | Knutson . |

Primary Examiner—J. Franklin Foss
Attorney, Agent, or Firm—Leonard Belkin

[57] ABSTRACT

A multiple purpose portable grill hanger which is constructed of tubular aluminum members. A horizontally disposed rectangle is formed by the aluminum members for supporting the grill. Vertically extending supporting arms extend over the top of a railing, vertically extending tail gate, etc. to support the hanger. Additional vertically extending arms help to keep the grill in place during use and a handy shelf is located on top of the supporting arms.

3 Claims, 1 Drawing Sheet

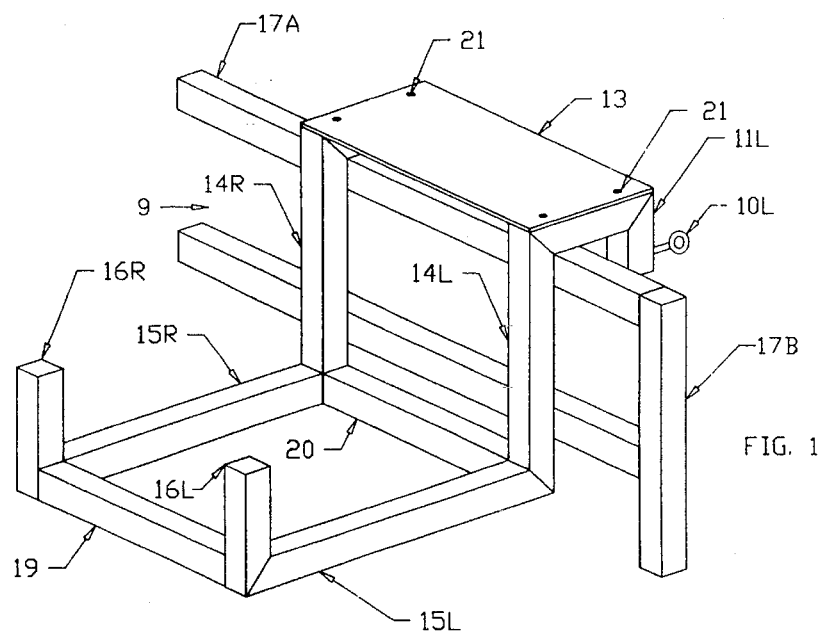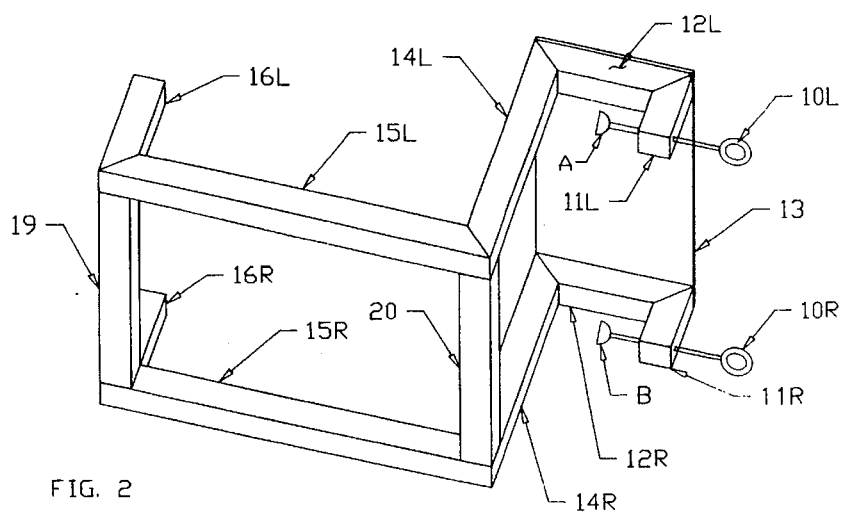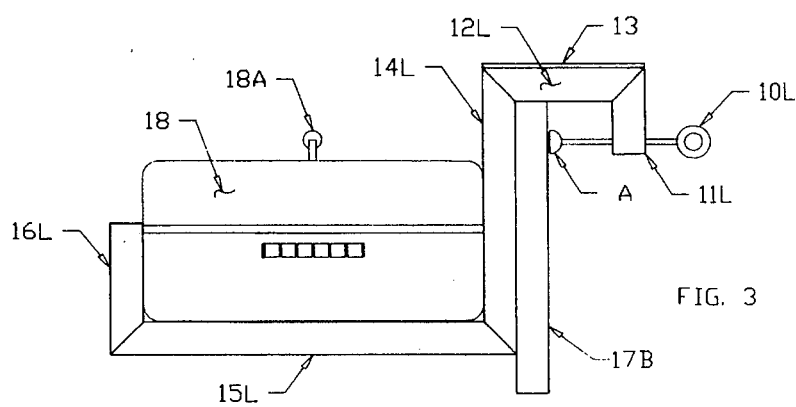

MULTI PURPOSE GRILL HANGER BRACKET

BACKGROUND OF THE INVENTION

This invention relates to a multi purpose grill hanger bracket for mounting small portable grills to four different railing type surfaces and over a tailgate of a pickup truck. More particularly it relates to a new outdoor cooking device mounted on a vertical member such as over a railing of a pontoon boat, a porch railing, a balcony railing, the top railing on a chain link fence, and over the tailgate of a pickup truck, etc.

It has become increasingly common that people are fond of entertaining guest, family and friends more and more outdoors. This unique invention is very practical and inexpensive way for lots of people to enjoy grilling in a variety of different settings. Tens of thousands of people already own these small inexpensive table top grills, but often find these grills to be inconvenient to use due to limited space and other restrictions.

DISCUSSION OF PRIOR ART

Barbecue grill apparatus of various types are utilized throughout the prior art to permit outdoor cooking of different foods. Some barbecue grills are positioned within a balcony structure of an associated dwelling for convenience and access to the grill. Some barbecue grills have been mounted on pedestals on pontoon boat decks for cooking on the water. In these and other situations there is limited space available, and the multi purpose grill hanger bracket of this invention gives a person a little more space to entertain their guest. A conventional cooking device for a boat has been disclosed in U.S. Pat. No. 3,032,783 by Swanson, Jr., in which a cooking grill and basin are extended from a boat over the water by means of a pair of support arms.

Another support apparatus has also been disclosed in U.S. Pat. No. 4,729,535 by Fraizer, in which the apparatus is supporting a cooking device, such as a barbecue, above the ground, water or the like. Another support device is disclosed in U.S. Pat. No. 5,009,380 by Fee, in which a rail mounted rack for bowl shaped or kettle shaped containers such as outdoor grills and the like are nested in the rack with the rack supported by a railing running along an edge of a deck. Another barbecue grill housing apparatus is disclosed in U.S. Pat. No. 5,165,384 by Knutson, setting forth a barbecue grill housing apparatus in a wire cage that hangs over a balcony railing. Another support device is disclosed in U.S. Pat. No. 4,893,363 by Huff, on a hanging wall table for above ground swimming pools. Another support device is disclosed in U.S. Pat. No. 4,850,282 by Postic, on a portable food tray that hangs from a balcony railing.

SUMMARY OF THE INVENTION

The use of portable barbecue grills has become increasingly popular in various outdoor recreational activities such as boating, camping, hunting, and backyard cookouts. This invention of the multi purpose grill hanger bracket for portable grills, gives the user different ways to attach their grill for cooking. In a balcony setting, for example, a small table top grill would be placed on a table or the deck floor of a balcony. With the multi purpose grill hanger bracket this same grill can be attached over the balcony railing. This frees the table for drinks, plates or whatever. Also by the grill being attached to the railing eliminates bending over the table or kneeling on the deck floor to turn steaks over. The grill is right where you want it and easy to reach.

Another example is people who have very small porches with a railing can attach their small table top grill over the porch railing and grill on the porch. Another good use for the multi purpose grill hanger bracket is that hunters or campers can attach a small grill over their pickup truck tailgate and barbecue away. This gives a whole new meaning to fall football games tailgate parties. Another very practical way to use the multi purpose grill hanger bracket is to attach your grill over a pontoon boat railing so the grill itself is hanging over the side of your boat. A big plus here is after cooking, you can store the small portable grill and bracket under the boat seats, were both grill and bracket are out of sight and out of the way. Thus allowing maximum utilization of space on a boat for entertaining your guest.

Another very simple and effective way to use the multi purpose grill hanger bracket is that it can be used to attach a small table top grill over the railing of a chain link fence. This is great for those little backyard gatherings with friends and family, thus again freeing your picnic table for holding plates, food, and drinks. The multi purpose grill hanger bracket is designed to fit a specific size portable grill already on the market, like a hand in a glove.

The object of the present invention is to provide many different uses for tens of thousands of inexpensive table top grills already being used nation wide. It is pratical, durable, light weight, attractive looking, rust proof, affordable and a very versatile invention. I love mine and wouldn't go boating without it.

BRIEF DESCRIPTION OF THE DRAWINGS

FIG. 1 is a side perspective view of the bracket assembly attached to a railing.

FIG. 2 is a bottom perspective view of the bracket assembly.

FIG. 3 is a direct side view of the bracket assembly attached to a railing while supporting a grill.

REFERENCE NUMERALS IN DRAWINGS

| REFERENCE NUMERALS IN DRAWINGS | |
|---|---|
| 9 | bracket assembly |
| 10L | adjustment screw left |
| 10R | adjustment screw right |
| 11L | rear support handle left |
| 11R | rear support handle right |
| 12L | upper support left |
| 12R | upper support right |
| 13 | shelve assembly |
| 14L | vertical support left |
| 14R | vertical support right |
| 15L | horiontal support left |
| 15 | horiontal support right |
| A | nut plate left |
| B | nut plate right |
| 16L | front support left |
| 16R | front support right |
| 17A | hortiontal railing |
| 17B | vertical railing |
| 18 | portable grill |
| 18A | portable grill handle |
| 19 | front middle connecting bar |
| 20 | rear middle connecting bar |
| 21 | shelve attachment screws |

DETAILED DESCRIPTION OF THE INVENTION

The present invention pertains to a bracket assembly for supporting a conventional cooking device, such as a barbecue, at a desired location. In an exemplary embodiment the support assembly is particularly adapted for use over a railing type structure. It should be appreciated however, that the bracket assembly of the present invention may be attached to other structures such as a pontoon boat railing, porch railing, balcony railing, chain link fence railing, and over the tailgate of a pickup truck. With the exception of the shelve assembly, nut plates, and the adjustment screws the said bracket is all aluminum 1 inch square tubing welded together.

Referring now to the drawing, FIG. 1 shows the multi purpose grill hanger bracket assembly 9 attached to a railing 17A showing a side elevational profile of the bracket assembly. Railing 17A is a horizontal top railing and 17B a vertical railing, which extends downwardly. Typically, the vertical bar is secured at the lower end to a header plate (not shown) in FIG. 2. FIG. 2 shows the adjustment screw 10L and 10R for the purpose of securing the said assembly to different railing type surfaces.

The two adjustment screws 10L and 10R are housed in the distal ends of the two rear support arms or handles 11L and 11R. See FIG. 2 for drawing showing 11L rear support handle left and upper support left 12L. Nut plates A and B inside both rear support threaded handles 11L and 11R, respectively enable the adjustment screws 10L and 10R to tighten up against the said railing structure 17A. The two rear support handles 11L and 11R are connected directly to the two upper supports 12L and 12R at 90 degree angles. The two upper supports 12L and 12R are connected directly into the two vertical supports 14L and 14R at 90 degree angles, thus showing the appearance of the number seven. The two vertical supports 14L and 14R are connected to the two horizontal supports 15L and 15R at 90 degree angles.

The two horizontal supports 15L and 15R are connected directly to the two vertical front supports 16L and 16R at 90 degree angles. Thus showing a small inverted U shape connected to a larger U shape assembly. The rear middle connecting bar 20 and the front middle connecting bar 19 connect both the left side and right side of the said assembly together. The rear middle connecting bar 20 is connected to the back end of the two horizontal supports 15L and 15R to connect the rear of the said assembly. The front middle connecting bar 19 is connected to the front end of the two horizontal supports 15L and 15R to connect the front end of the said assembly.

On top of the upper supports 12L and 12R a shelve assembly 13 is mounted for carrying sundry items while the grill is in use. The shelve assembly 13 is secured with two screws 21 in the left upper support 12L and two screws 21 in the right upper support 12R.

FIG. 3 shows a direct side view of the said assembly attached to a railing 17B supporting a portable grill 18. Shown in the same FIG. 3 is the handle 18A for the portable grill 18.

While only a certain preferred embodiment of this invention has been described, it is understood that many variations are possible without departing from the principles of this invention as defined by the claims which follow.

I claim:

1. A multi purpose portable grill hanger in combination with a portable grill for removably hanging from the top of a substantially vertically extending wall means comprising:

a plurality of extended rod-like members formed into the shape of a hollow rectangle in a horizontal plane;

a first pair of arms extending vertically upward from two adjacent corners of said rectangle, the tops of said arms forming inverted u-shaped arms draped over the top of said vertically extending wall means, the tops of said arms including a pair of parallel, horizontal sections when said hanger is mounted on said wall means;

shelf-like means mounted on and spanning the upper surfaces of said horizontal sections forming a shelf integral with and removable along with said hanger;

a second pair of arms extending vertically upwardly from the remaining two corners of said rectangle to insure that said grill remains in place while in use;

screw-like means mounted in the distal ends of said u-shaped arms adjacent said shelf for clamping said hanger to said vertical wall means for securing said hanger in place in a manner to permit ready unclamping and removal of said hanger from said wall means, said screw-like means being the only attachment of said hanger to said Wall means; and said portable grill cradled on said hollow rectangle to permit said grill to be used for cooking while supported on said wall means.

2. The multi purpose portable grill hanger of claim 1 in which said rod-like members and said arms are made from hollow aluminum tubing welded together into a lightweight structure for ease of storing and transporting.

3. The multi purpose portable grill hanger of claim 2 in which said screw-like means comprises adjustment screws threaded through each of said first pair of arms terminating at one end in a nut plate for engagement with said wall means and terminating at the other end in handles to permit each said adjustment screw to be tightened up against said wall means to secure said grill hanger in place.

* * * * *